United States Patent [19]

Sharples

[11] 4,291,850
[45] Sep. 29, 1981

[54] CONTRACTABLE SHOCK ABSORBER STRUT

[75] Inventor: Wilbert Sharples, Marietta, Ga.

[73] Assignee: Lockheed Corporation, Burbank, Calif.

[21] Appl. No.: 22,211

[22] Filed: Mar. 19, 1979

[51] Int. Cl.³ .................... B64C 25/10; B64C 25/58
[52] U.S. Cl. .................... 244/102 SS; 244/104 FP; 267/64.12
[58] Field of Search ........ 244/104FP, 104 R, 102 SS, 244/102 R; 267/64 R, 65 R, 65 D, DIG. 1; 91/519

[56] References Cited

U.S. PATENT DOCUMENTS

| | | | |
|---|---|---|---|
| 1,918,426 | 7/1933 | Radnor | 244/102 SS |
| 2,647,708 | 8/1953 | Haverlin | 244/102 R |
| 2,735,634 | 2/1956 | Fosness | 244/102 SS |
| 2,735,674 | 2/1956 | Smith et al. | 244/104 FP |
| 2,814,482 | 11/1957 | Anderson et al. | 244/104 FP X |
| 2,863,623 | 12/1958 | Lebold | 244/102 R |
| 3,533,613 | 10/1970 | Bendicsen | 267/64 R |

Primary Examiner—Charles E. Frankfort
Attorney, Agent, or Firm—John J. Sullivan

[57] ABSTRACT

This shock absorber strut incorporates an annular piston between the lower and upper bearings of the shock absorber piston; together with a separator piston in the bore of the shock absorber piston. The volume below the separator piston is filled with hydraulic fluid and is connected to an external hydraulic power source. An external hydraulic power source is also connected between the annular piston and the shock absorber lower bearing. Application of external hydraulic pressure to the underside of the annular piston, while simultaneously draining off fluid below the separator piston, causes the shock absorber to contract. The volume vacated by the fluid below the separator piston provides a reservoir for displaced shock absorber fluid which pushes the separator piston down the bore of the shock absorber piston. The contracted strut is then locked hydraulically. The procedure is reversed for shock absorber extension.

7 Claims, 4 Drawing Figures

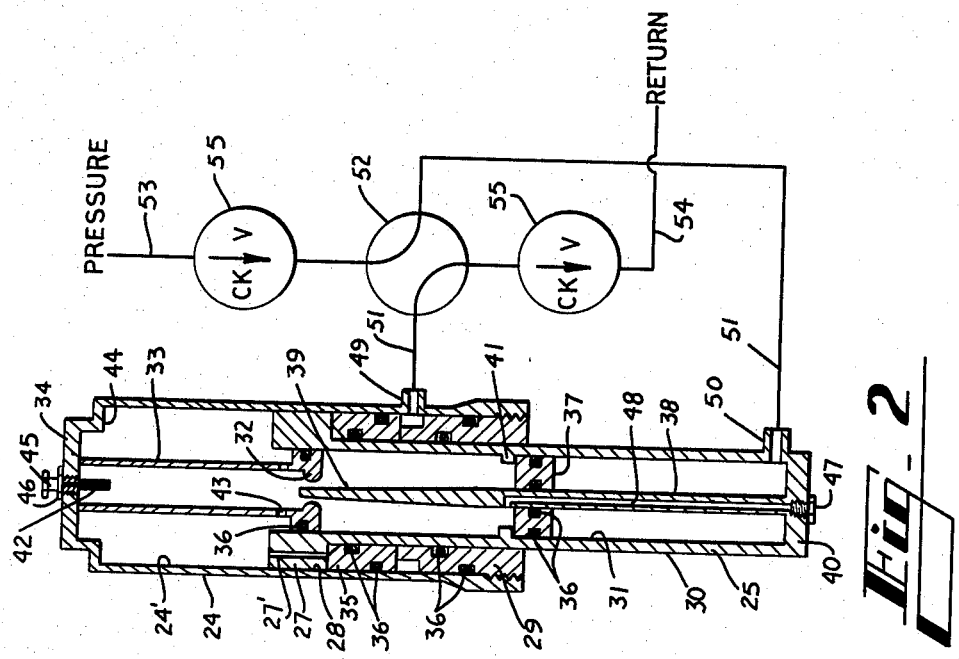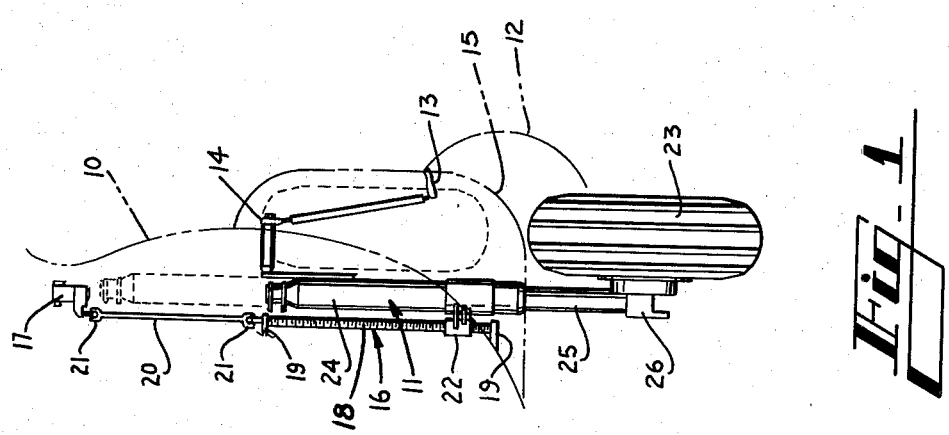

CONTRACTABLE SHOCK ABSORBER STRUT

DESCRIPTION

Technical Field

This invention relates to shock absorber struts and more particularly to such shock absorber struts which are contractable. Shock absorber strut contraction is desired for many reasons, for example, in their application to aircraft landing gear, contraction is required in order to lower or kneel the aircraft, to facilitate on-and-off-loading of cargo, to lower the aircraft center of gravity as for carrier deck launching, or to stow a strut into a confined area.

Background Art

Existing methods to the extent that they contract a shock absorber strut utilize mechanical devices external to the normal operation of the strut. Illustrative of such prior art devices are those disclosed in the following U.S. Pat. Nos.:

2,754,072 dated July 10, 1956, issued to Sam Shapiro
3,011,777 dated Dec. 5, 1961, issued to George C. Stout and the following British Pat. No.:

765,815 dated Jan. 16, 1957, issued to Svenska Aeroplane Aktiebolaget.

These patented devices are conventional shock struts which incorporate mechanical means to contract them during retraction. Shapiro employs an external cylinder for this purpose. In Stout pressurized shock absorber air is bled off to atmosphere during contraction and displaced oil is transferred to an annular space provided exterior to the normal shock strut. Fluid transfer and air bleed-off is sequenced through a valving device connected to the strut. During extension of the strut for landing, the air chamber must be recharged from an accumulator provided with the strut. The British patented device simply uses an actuator external to the strut. By action of the retraction linkage, oil is transferred to a reservoir at the top of the strut.

Disclosure of Invention

In accordance with the present invention a strut is provided in which the shock absorber is collapsed by allowing shock absorber fluid to bleed down into the strut piston bore. The contracting or "squat" feature is thus self-contained with no requirement for external squat, bleed-off cylinders or mechanical devices.

To the above ends the present shock absorber strut consists essentially of modifying a typical shock absorber by incorporating a contracting piston in the annular area thereof between the strut piston and the outer cylinder, and by adding a floating piston to the bore of the strut piston. The area below the contracting piston is ported to the airplane hydraulic system via a control valve and is normally open to return. The area below the floating piston is also ported to the airplane hydraulic system via the control valve and is normally open to pressure. The pressure side of the control valve is backed up by a check valve, which creates a hydraulic lock for the pressurized port of the shock strut.

BRIEF DESCRIPTION OF THE DRAWINGS

FIG. 1 is a view from the front of an airplane landing gear unit modified to incorporate a shock absorber strut constructed in accordance with the teachings of this invention, showing a typical installation of the gear in the airplane for extension and retraction, the extreme positions of which are shown in solid and dotted lines respectively;

FIG. 2 is a longitudinal section taken through the shock absorber strut of FIG. 1 to show the fully extended position thereof and a schematic of the fluid lines and valves whereby it is maintained in the shock absorbing condition;

DETAILED DESCRIPTION

Figure 4:
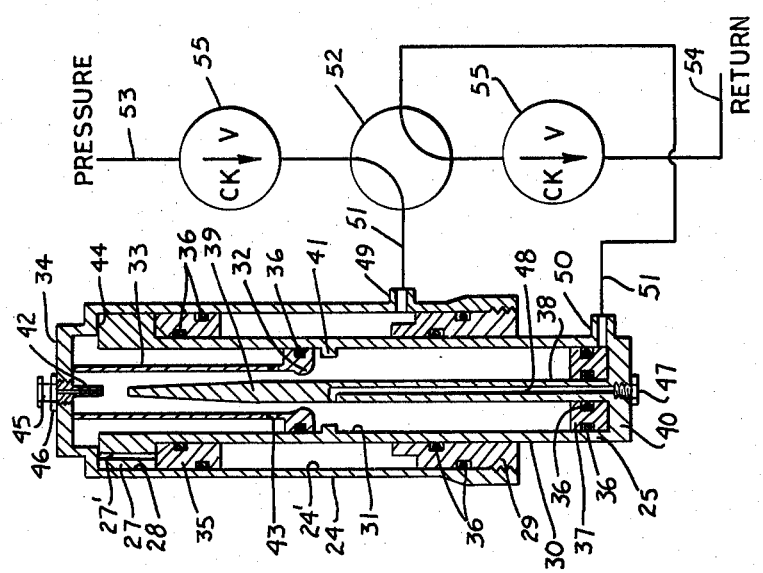
FIG. 4 is a similar view to show the shock absorber strut in the fully contracted position, i.e., the strut is under no load but compressed by operation of the control valve and the internal pressurized fluid.

Referring more particularly to the drawings, the structure of the preferred embodiment of the invention will be described. The numeral 10 designates a portion of an aircraft component in the area of a landing gear unit 11 thereof. A door, 12 is hinged as at 13 to the component 10 and adapted to be swung relative thereto by means of and through an actuator and linkage 14 to and from extreme positions where it overlies and encloses an opening 15 in the component 10 and is disposed outwardly therefrom.

The gear 11 is mounted in any conventional manner to structure within the component 10 for movement to and from extreme positions of retraction totally within the component 10 and extension totally outwardly of the component 10. To this end a power actuator for example, a screw jack 16 may be employed which is driven by a suitable motor 17. More specifically, a ball screw 18 is secured at opposite ends to fixed structure 19 within the component 10 and is rotatable through a drive shaft 20 and universal joints 21 between its upper end and the motor 17. A ball nut 22 operative on the ball screw 18 connects to the gear 11. Thus the gear 11 is moved vertically to and from the extreme positions illustrated in FIG. 1 in phantom and solid lines to locate the gear 11 and its associated wheel 23 in the stowed and extended positions respectively. In so moving, the gear 11 passes through the opening 15 which is opened and closed by operation of the actuator 14 and movement of the door 12.

Essentially, the gear 11 includes a shock absorber strut formed by a outer cylinder 24 at its upper or inner end and a piston 25 at its lower or outer end. The cylinder 24 is connected to the screw jack 16 through the ball nut 22 while the lower end of the piston 25 connects through an axle 26 to the wheel 23.

The piston 25 is slideable in the cylinder 24 being formed or otherwise provided with a peripheral bearing 27 at its inner end having a peripheral surface 28 slideable on and against the inner cylinder wall 24'. The outer or lower end of the cylinder 24 carries a bearing 29 mounted therein against the inner peripheral surface of which the outer piston surface 30 coacts. The inner piston surface 31 coacts with the peripheral surface of a bearing 32 carried by a support tube 33 extending from the upper end wall 34 of the cylinder 24. For reasons to become more apparent an annular contracting piston 35 is mounted within the cylinder 24 between the adjacent ends of the bearings 27 and 29, adapted for sliding coaction with the inner cylinder wall or surface 24' and the outer piston surface 30. Appropriate seals 36 are associated with the several bearing and piston surfaces as is customary practice to prevent the passage of fluid. However, a bleed passage 27' is provided through the bearing 27 to permit fluid flow between the upper and lower surfaces thereof to prevent cavitation as will become more apparent.

Internally the piston 25 carries an annular floating piston 37 slideably mounted on and against the inner wall or surface 31 thereof and the external wall 38 of a tapered, metering pin 39 secured to and extending from the lower end wall 40 of the piston 25 to the support tube 33. The piston 37 is thereby mounted for substantially unrestricted movement between the wall 40 and a projection 41 on the wall 31 approximately mid-way in the length of the piston 25. Seals 36 are also employed in the surfaces of the piston 37 adjacent the piston wall 31 and the metering pin wall 38 to prevent fluid leakage therethrough.

A filler tube 42 is provided in the upper end wall 34 of the cylinder 24 within the support tube 33 to permit the injection of shock absorber fluid to the interior of the cylinder 24. One or more openings 43 in the wall of the tube 33 allows fluid to pass into and fill the entire cylinder 24. The length of this tube 42 is such that it coacts with a shoulder 44 formed on the inner wall of the cylinder 24 to establish the fluid level desired upon total retraction of the piston 25. An inflation valve 45 is incorporated in a cap 46 which closes the outer end of the filler tube 42 to facilitate the injection of air into the cylinder 24 in the area thereof above the fluid level at the desired pressure.

In the lower end wall 40 of the piston 25 is an opening or drain closed by a plug 47 which aligns with a passage 48 extending through the center of the pin 39 to a point beyond the projection 41 where it opens on the surface of the pin 39. This permits the draining of shock absorber fluid from the cylinder 24 and the upper portion of the piston 25.

Adjacent the lower end of the cylinder 24 a hydraulic fluid port 49 is provided. This port 49 opens internally of the cylinder 24 at a point below the piston 35 at all positions in its movement along the inner wall 24' of the cylinder 24. A similar hydraulic fluid port 50 is provided in the piston 25 adjacent its lower end wall 40. A duct 51 connects each port 49 and 50 to opposite sides of a control valve 52 through which it is selectively connected to either the system pressure of the airplane through a duct or line 53 or to return through a duct or line 54. A one way check valve 55 is incorporated in each line 53 and 54 to limit the direction of flow.

Operation of the Preferred Embodiment

Figure 3:
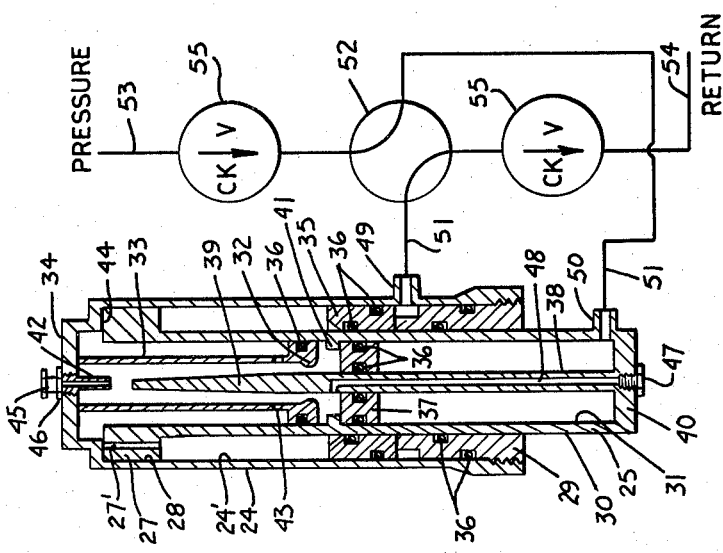
FIG. 3 is a similar view to show the shock absorber strut in the fully compressed position, i.e., the strut is under full load.

Normally the shock absorber strut 24 and 25 functions as indicated by the two extreme positions depicted in FIGS. 2 and 3. Thus, with the control valve 52 connecting port 50 to line 53 and system pressure, shock absorber fluid is delivered to the lower portion of the piston 25 where it acts on and against the floating piston 37 forcing it against the projection 41. At this time port 49 is connected to line 54 and shock absorber fluid in the cylinder 24 below the contracting piston 35 is forced to return.

When contraction of the shock absorber strut 24 and 25 is required the control valve 52 is operated to port pressure from the system and line 53 to port 49 where it acts against the contracting piston 35. At this time the valve 52 connects the port 50 to line 54 and return. The application of pressure to the contracting piston 35 causes the strut piston 25 to telescope into the cylinder 24 and simultaneously the floating piston 37 moves down the piston 25. Shock absorber fluid is thereby allowed to be displaced from the cylinder and upper piston area above the projection 41 to the lower piston area below the projection 41 as depicted in FIG. 4. For return of the shock absorber strut 24 and 25 to normal operation this entire procedure is reversed.

While the invention has been hereinabove illustrated and described in what is believed to be its best and most practical form under present-day conditions, it is recognized that under other conditions this form would be modified. No attempt has been made to specifically incorporate any of such other forms in this disclosure in the interest of clarity of the total inventive concept. The claims are relied upon to cover these other forms generally.

I claim:

1. A contractable single acting shock absorber strut comprising:
    an outer cylinder closed at one end and open at the other end;
    a centrally open bearing defining the open end of said cylinder;
    a strut piston mounted for reciprocation in said cylinder and extendable therefrom through said centrally open bearing, said strut piston being closed at its extendable end and open at its other end whereby shock absorber fluid is free to pass between the interiors of said cylinder and said strut piston;
    a contracting piston slideably mounted in said cylinder externally of said strut piston;
    a floating piston slideably mounted in the extendable end of said strut piston;
    a first constantly open fluid port in said cylinder between said contracting piston and said centrally open bearing;
    a second constantly open fluid port in said strut piston between said floating piston and the extendable end of said strut piston;
    a source of hydraulic fluid pressure;
    a return to said source;
    a first fluid duct between each of said first and second fluid ports and said hydraulic fluid source;
    a second fluid duct between each of said first and second fluid ports and said return; and
    a control valve for said fluid ducts operable to selectively connect either one of said fluid ports to receive hydraulic fluid from said source and simultaneously connect the other of said fluid ports to said return whereby said floating piston may be hydraulically locked in a fixed position while said strut piston is free to reciprocate in said cylinder and may be selectively unlocked while said strut piston is fully contracted into said cylinder.

2. The contractable shock absorber strut of claim 1 including filler tube means in said closed cylinder end to limit the reciprocation of said strut piston into said cylinder and the shock absorber fluid level therein.

3. The contractable shock absorber strut of claim 2 further including an inflation valve in said closed cylinder end for the injection of air at a selected pressure.

4. The contractable shock absorber strut of claim 1 including a tube extending from the closed end of said cylinder and terminating in an orifice defining end in sliding abutment against the inner surface of the strut piston at all times during the reciprocation of said strut piston in said cylinder and a metering device associated with said orifice to vary the effective size thereof during said strut piston reciprocation.

5. The contractable shock absorber strut of claim 4 wherein said metering device is a tapered pin extending from the extendable end of said strut piston to the interior of said tube and includes an axial passage whereby shock absorber fluid in said cylinder may be drained therefrom.

6. The contractable shock absorber strut of claim 1 including a check valve in each of said fluid ducts between said control valve and said fluid source to restrict the direction of fluid flow.

7. The contractable shock absorber strut of claim 1 in combination with an aircraft component and including a power actuator secured to said aircraft component at one end and to said cylinder at the other end, and a wheel mounted on an axle secured to the extendable end of said strut piston to thereby constitute an extendable and retractable landing gear unit for said aircraft.

* * * * *